(12) United States Patent
Sanchez et al.

(10) Patent No.: US 8,582,188 B2
(45) Date of Patent: Nov. 12, 2013

(54) SPOT COLOR PRESS EMULATION COLOR TRANSFORMATION METHOD AND SYSTEM

(75) Inventors: J. Michael Sanchez, Rochester, NY (US); Yongda Chen, Pittsford, NY (US); Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1098 days.

(21) Appl. No.: 12/557,283

(22) Filed: Sep. 10, 2009

(65) Prior Publication Data
US 2011/0058238 A1 Mar. 10, 2011

(51) Int. Cl.
*G03F 3/08* (2006.01)

(52) U.S. Cl.
USPC .......................................... 358/518

(58) Field of Classification Search
None
See application file for complete search history.

(56) References Cited

U.S. PATENT DOCUMENTS

| | | | | |
|---|---|---|---|---|
| 6,226,103 | B1 | 5/2001 | Klassen et al. | 358/1.9 |
| 6,778,294 | B1 * | 8/2004 | Keefer | 358/1.9 |
| 8,014,027 | B1 * | 9/2011 | Kulkarni et al. | 358/1.9 |
| 2001/0043376 | A1 * | 11/2001 | Kumada et al. | 358/504 |
| 2002/0154325 | A1 * | 10/2002 | Holub | 358/1.9 |
| 2007/0139671 | A1 * | 6/2007 | Stevens | 358/1.9 |
| 2008/0043271 | A1 | 2/2008 | Gil et al. | 358/1.9 |
| 2008/0291479 | A1 | 11/2008 | Mestha et al. | 358/1.9 |
| 2009/0002726 | A1 | 1/2009 | Osadciw | 358/1.6 |
| 2009/0122325 | A1 | 5/2009 | Farrell et al. | 358/1.9 |

OTHER PUBLICATIONS

GRACoL-General Requirements and Applications for Commercial Offset Lithography; http://www.idealliance.org/industry_resources/brandingmedia_and_color/gracol SWOP; http://www.swop.org/about/index.asp.

* cited by examiner

*Primary Examiner* — Jeremiah Bryar
(74) *Attorney, Agent, or Firm* — Kermit D. Lopez; Luis M. Ortiz; Ortiz & Lopez, PLLC

(57) ABSTRACT

A spot color rendering system and method that incorporates spot color press emulation color transformation to preserve spot color on a target rendering device. A spot color rendering option implemented in a graphical user interface can be selected in order to render the spot color via an intermediate emulation space. The spot color name calls can be first associated with a color value in an ICC profile connection space (PCS), as CIE L*a*b* or XYZ. A database relation of the spot color name with its associated PCS numerical value enables association of the name with the resultant color transformed output. Thereafter, a color transformation with respect to the spot color value can be performed in order to compute a color on an emulation press and then the color can be preserved to the target rendering device. Such an approach enables a color consistent rendering to the target rendering device similar to that of the emulation press.

20 Claims, 6 Drawing Sheets

SPOT COLOR PRESS EMULATION COLOR TRANSFORMATION METHOD AND SYSTEM

TECHNICAL FIELD

Embodiments are generally related to image processing methods and systems. Embodiments are also related to rendering and calibration systems and techniques. Embodiments are also related to the press emulation of spot colors.

BACKGROUND OF THE INVENTION

Color image processing systems often include an input device (e.g., a scanner, copy machine, etc), an image manipulation device (e.g., a workstation), and one or more output devices (e.g., monitors, rendering devices, color print presses, etc.). Within such systems, consistency of color reproduction across system components is desirable. It is also desirable to attain similar consistency of color reproduction when image files are transferred between different color image processing systems.

In the printing of images on print media utilizing a rendering device, it is a common problem to emulate a color from a physical color patch supplied by, for example, a customer for print articles. The commercial rendering industry requires the capability of producing a spot color accurately and consistently in order to meet particular demands. Spot colors are specially mixed inks that can be applied by a printing press or other rendering device and are in contrast with overlayed CMYK (cyan, magenta, yellow, black) inks which can be applied by a process printing technique. Spot colors are typically characterized utilizing either CMYK or device independent colors such as, for example, those associated with the CIE L*a*b* Color Scale.

In common CMYK and RGB (red, green, blue) press emulation modes, an incoming image, graphics, and text object types for the data streams CMYK and RGB can be rendered such that the color values of an intermediate emulation press can be preserved to a target rendering device via color transformations. Such press emulation color preservation technique enables color consistent rendering to the target rendering device in a manner similar to that of the emulation press. In particular, when the target rendering device color gamut differs from the offset press color gamut, emulation enables similarity across the digital and offset rendering device in terms of visual color output. Conventionally, if a print shop that desires an offset emulation for an entire rendering job (e.g., a print job) via digital rendering, the color emulation can be achieved for RGB and CMYK workflows, but not for a spot color workflow. The spot colors, however, can be rendered only to the target rendering device with no ability to be preserved as if they were rendered to the offset press.

Based on the foregoing, it is believed that a need exists for an improved method and system for press emulation of spot colors in order to enable color matching across different data workflows and rendering workflows during a color offset complement digital rendering. A need also exists for appropriately mapping a target color in an ICC workflow to enable color preservation across the rendering device, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved image processing method, system, and computer-usable medium.

It is another aspect of the present invention to provide for an improved spot color press emulation color transformation method and system.

It is a further aspect of the present invention to provide for an improved method and system for mapping a target color in an ICC workflow to enable color preservation across a rendering device.

It is yet a further aspect of the present invention to provide for an improved method for ensuring RIP (Raster Image Processor) speed optimization during the spot color emulation.

The aforementioned aspects and other objectives and advantages can now be achieved as described herein. A spot color rendering system and method is disclosed, which incorporates spot color press emulation color transformation to preserve a spot color with respect to a target rendering device. A spot color rendering option implemented in the context of a GUI (Graphical User Interface) can be selected in order to render the spot color via an intermediate emulation space. The spot color name calls can be initially associated with a color value in an ICC profile connection space (PCS), as CIE L*a*b* or XYZ. (Note that as utilized herein, the acronym ICC generally refers to "International Color Consortium," an industry consortium, which has defined an open standard for a color-matching module (CMM) at the OS level and color profiles for the devices and working space).

A database can be configured to include data indicative of the relation of the spot color name with its PCS numerical value to enable an association of the name with the resultant color transformed output. Thereafter, a color transformation with respect to the spot color value (L*a*b* or XYZ) can be performed in order to compute a color on an emulation press. Thereafter, the color can be preserved to the target rendering device. Such an approach enables color consistent rendering to the target rendering device similar to that of the emulation press.

The color value associated with the spot color name can be transformed through an emulation press color profile (e.g., an ICC profile) utilizing a relative colorimetric destination LUT associated with the emulation press to CMYK value. The CMYK value can then be transformed through the emulation press color profile utilizing the LUT to a PCS color value that represents the spot color rendered on the emulation target. The PCS color value can be converted to the CMYK value utilizing the LUT that preserves the PCS color value and rendered on the target rendering device. Note that "emulation" refers to the ability to render the spot color calls on the target rendering device in a manner preserving the color of the emulation press CMYK such as, for example, Gracol, SWOP, ISO.

The spot color rendering option can be selected by invoking a radio selection button referred as "spot color emulation" in the context of the GUI. Such a graphical display selection button may be configured to seamlessly exist within an existing GUI selection of a color management section of a DFE (Digital Front End) component. By default, the GUI radio selection button may be unchecked (OFF) such that the spot color names in the rendering job preserve color directly to the target rendering device. When, however, the GUI radio selection button is selected (ON), the spot color press emulation protocol can be followed to preserve the spot color as if rendered to the offset press. The system appropriately maps the target color in a color workflow that enables color preservation across devices and ensures RIP speed optimization during spot color emulation. The proposed approach can be utilized for in-gamut colors and out-of-gamut colors. For out-of-gamut colors, engine-to-engine color variations can be reduced by mapping to an intermediate gamut closer to the rendering device gamut.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
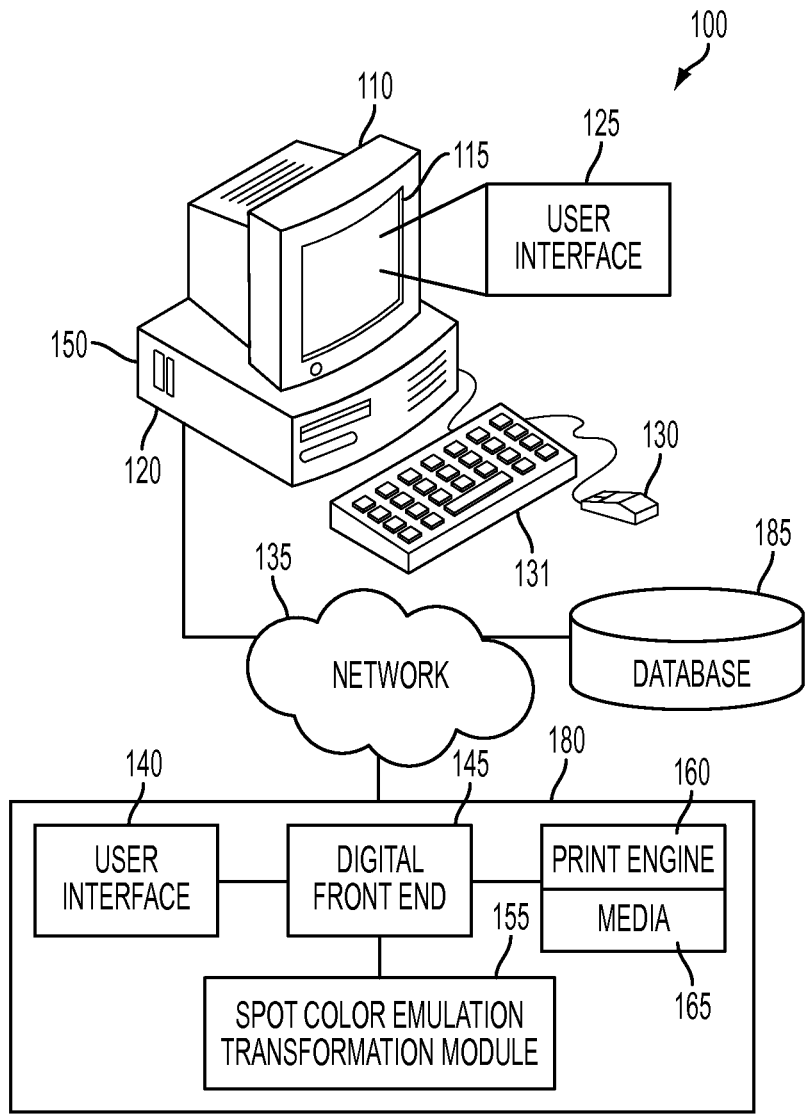
FIG. 1 illustrates an example of a rendering device coupled to a data-processing apparatus through a network, in accordance with an embodiment.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

FIG. 1 depicts a system 100 that includes a rendering device 180 coupled to a data-processing apparatus 110 through a network 135. The data-processing apparatus 110 may be, for example, a personal computer or other computing device (e.g., a laptop computer, wireless cellular telephone, Smartphone, etc) and generally includes a central processor 120, a display device 115, a keyboard 131, and a pointing device 130 (e.g., mouse, track ball, pen device, or the like). Additional input/output devices, such as the rendering device 180, may be included in association with the data-processing apparatus 110 as desired.

Note that as utilized herein, the term rendering device may refer to an apparatus or system such as a printer, scanner, fax machine, copy machine, etc., and/or a combination thereof. Preferably, rendering device 180 is capable of multiple rendering functions such as printing, copying, scanning, faxing, etc. In some embodiments, rendering device 180 may be implemented with a single rendering function such as printing. In other embodiments, rendering device 180 can be configured to provide multiple rendering functions such as scanning, faxing, printing and copying. Note also that in FIGS. 1-6 herein, identical or similar parts or elements are generally indicated by identical reference numerals.

The data-processing apparatus 110 can be coupled to the rendering device 180 through a computer network 135. Network 135 may employ any network topology, transmission medium, or network protocol such as, for example, a computer network, Ethernet, Internet, Intranet, etc. Network 135 may include connections such as wire, wireless communication links, or fiber optic cables. The data-processing apparatus 110 includes a GUI 125 that displays information and receives data through device display and/or the keyboard/mouse combination. The GUI 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

A rendering device driver program can be installed on the data-processing apparatus 110 and can reside on the host device's hard drive 150. The rendering device driver program may be activated through an application interface so that a user may generate a print job with the MFD driver for processing by the rendering device 180. The rendering device 180 can be configured to include a GUI 140, a Digital Front End (DFE) component 145, and a print engine 160. Note that the term digital front end or DFE, as discussed herein, generally refers to the central management component of the digital printing system of rendering device 180. The DFE component 145 is capable of loading files from various network sources associated with network 135 and processes the files so they can be outputted on various digital equipment, whether it be a small desktop printer or a large digital press. The DFE component 145, in most cases, is a powerful unit that accepts and processes files for variable data applications and also pulls information from a database 185 for more personalized documents. The DFE component 145 provides consistency in color, quality, and accuracy, assuring print providers and customers that projects will be of the highest standards at all times.

The GUI 140 associated with the rendering device 180 may include, for example, a graphically displayed panel menu that provides various input and selection features to enter data into the rendering device 180. Such a GUI may include, for example, touch screens having touch activated keys for navigating through an option menu or the like.

The DFE component 145 can include access to a module 155 that assists with press emulation of spot colors, typically embodied in software, and also modules that enable image processing and control functions such as those described with respect to FIGS. 2-6. It can be appreciated that the spot color emulation transformation module 155 can also be accessed through a pre-press system. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

The print engine 160 can access media 165 of various size and cost. A user can access and operate the rendering device 180 utilizing the user GUI 140 and/or via the data-processing apparatus 110. A user profile, work product for printing, media library, print job parameters, and so forth can be stored in database 185, which is accessible by the data-processing apparatus 110 or rendering device 180 via the network 135, or can be directly accessed via the rendering device 180. The GUI 140 can be used to communicate particular rendering device features for processing a rendering job to a user and accepting the user's selection of available rendering device features. The GUI 140 also serves to display results, whereupon the user may supply additional inputs or terminate a given session.

The following description is presented with respect to embodiments of the present invention, which can be embodied in the context of a data-processing apparatus 110 and rendering device 180 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 2:
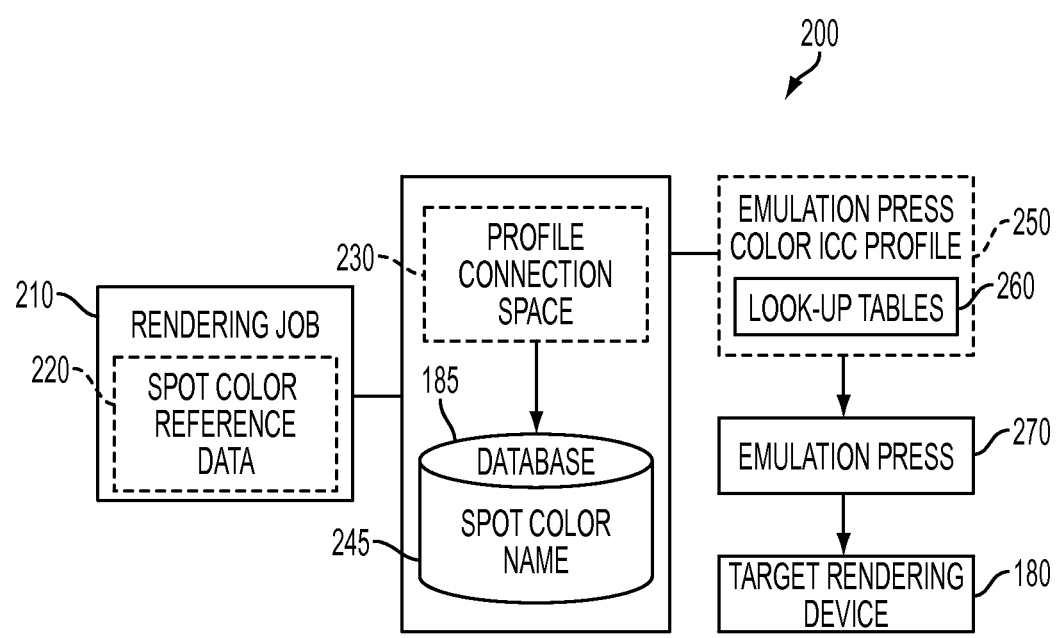
FIG. 2 illustrates a block diagram of a spot color rendering system, in accordance with an embodiment.

FIG. 2 illustrates a block diagram of a spot color rendering system 200, in accordance with an embodiment. Note that in FIGS. 1-6, identical or similar parts or elements are indicated by identical reference numerals. The system 200 can be utilized to render a spot color associated with a rendering job 210 (e.g., print job) via an intermediate emulation space such as SWOP (Specification for Web Offset Publications), GRACol (General Requirements for Applications in Commercial Offset Lithography) and other standard rendering processes. The spot color can be defined as any color generated by an ink (pure or mixed) that is rendered using a single run. The rendering process is composed of four spot colors namely cyan, magenta, yellow, and key (black), commonly referred to as CMYK. The term spot color refers generally, however, to any color generated by a non-standard offset ink such as metallic, fluorescent, spot varnish, or custom hand-mixed inks.

The system 200 matches an expected output produced via an emulation press 270 rather than matching the specification of the spot color directly. Note that as utilized herein, the term emulation generally refers to the ability to render the spot color calls on a target rendering device 180 in a manner preserving the color of the emulation press CMYK such as SWOP, GRACOL. The spot color name calls are generally associated with one or more color values defined in an ICC profile connection space (PCS) 230. Note that the International Color Consortium (ICC) has defined and standardized a device-independent intermediate color space called the PCS. The ICC defines profiles that utilize specific data structures to standardize how color can be managed by displays and marking devices. The profile connection space 230 is not dependent upon the input/output device and is defined by CIE XYZ color space or CIELAB color space.

The color values can be determined by searching a spot color name 245 in the database 185. The database 185 can be configured to include a relation of the spot color name 245 with its associated PCS numerical value and enable association of the color name 245 with a resultant color transformed output. These values represent the color values of the actual spot color name as denoted by the spot color reference data 220. In case of Pantone spot color names, for example, the color value can represent the color as it exists from the Pantone coated swatch book.

The PCS version of the spot color (L*a*b* or XYZ) can be utilized to compute a color on the emulation press 270 and the color can be preserved on the actual target rendering device 180. The PCS value of the spot color name can be transformed through an emulation press color ICC profile 250 utilizing a relative colorimetric destination LUT 260 associated with the emulation press 270 to CMYK value. Note that as utilized herein, the acronym LUT generally refers to "Look-Up tables", which define a form of a device profile characterization data for a particular device. The CMYK values can then be transformed through the emulation press color ICC profile 250 utilizing the LUT 260 to a PCS color value that represents the spot color rendered on the emulation target 270. The PCS color value can be converted to the CMYK value utilizing the LUT 260 that preserves the PCS color value, but rendered on the target rendering device 180. Upon rendering, the spot color rendered to the target rendering device 180 closely matches the color that would have printed separately on the emulation press 270.

Figure 3:
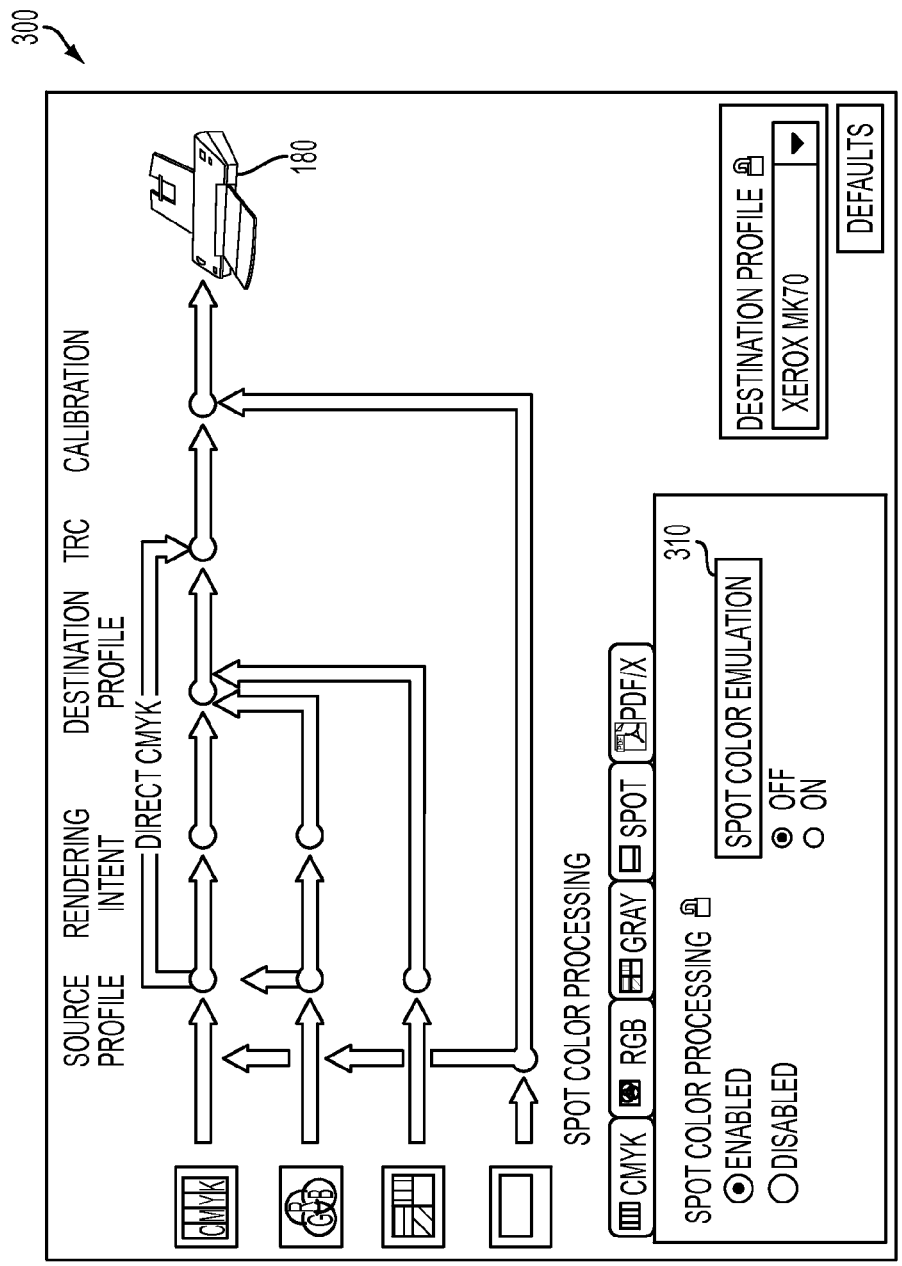
FIG. 3 illustrates a GUI for implementing a spot color emulation in color digital rendering, in accordance with an embodiment.

FIG. 3 illustrates a GUI 300 for implementing the spot color emulation in color digital rendering, in accordance with an embodiment. The GUI 300 includes a spot color emulation button 310 associated with an on/off operation to enable and disable the spot color emulation. Note that the user interface, as utilized herein, generally refers to a type of environment that represents programs, files, options, and so forth by means of graphically displayed icons, menus, and dialog boxes on a screen. A user can interact with the user interface to select and activate such options by pointing and clicking with a user input device such as, for example, a touch screen, a keyboard on the like. A particular item may function in the same manner with respect to the user in all applications because the user interface provides standard software routines to handle these elements and reports the user's actions. Note that GUI 300 can be implemented utilizing a GUI such as the GUI 140 depicted in FIG. 1 and can be provided by a module such as, for example, module 155.

Figure 4:
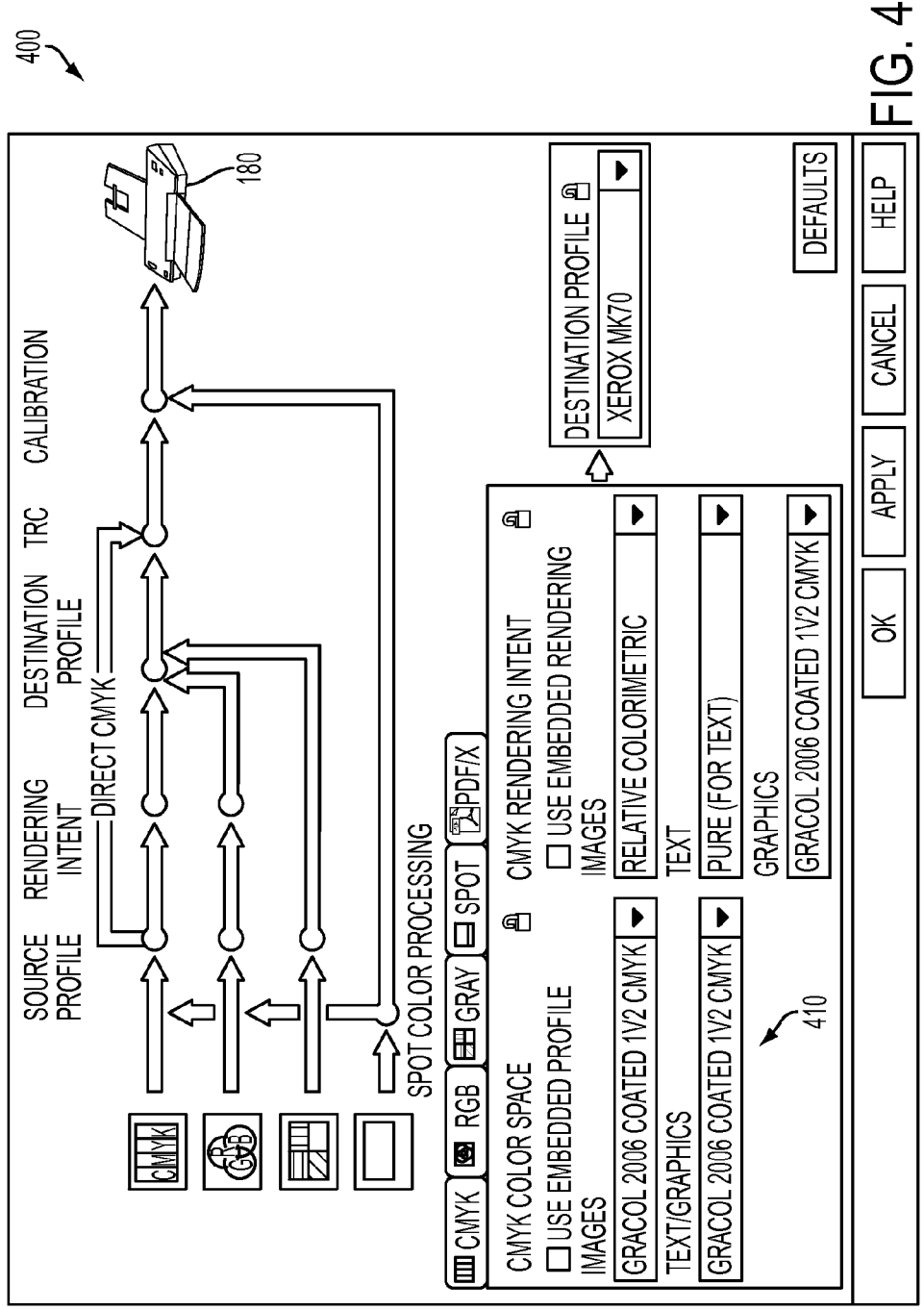
FIG. 4 illustrates a GUI for selecting a spot color CMYK press emulation, in accordance with an embodiment.

The spot color emulation button 310 can be a radio selection button represented as "spot color emulation" that can be designed to seamlessly exist within an existing UI selection for color management on the DFE 145. Note that a radio button is a GUI element which permits a user to select spot color emulation data by "checking" one or more graphically displayed click buttons. When a button is selected, all other buttons in the same group are unselected. By default, the UI radio selection button 310 is unchecked (OFF) and the spot color names associated with the rendering job preserve color directly to the target rendering device 180. However, when the UI radio selection button 310 is selected (ON), the spot color press emulation transformation 155 can be followed to preserve the spot color as if rendered to the offset press. Also, the color values for the spot color names can be preserved to the target rendering device 180 in a manner such that the color is preserved from the intended offset press emulation. Further, the GUI 300 illustrates a number of workflows associated with varying color contents such as CMYK content, RGB content, gray color content, and a spot color content. FIG. 4 illustrates a GUI 400 for selecting spot color CMYK press emulation 410, in accordance with an embodiment. Again as reminder, in FIGS. 1-6, identical or similar parts or elements are indicated by identical reference numerals.

Figure 5:
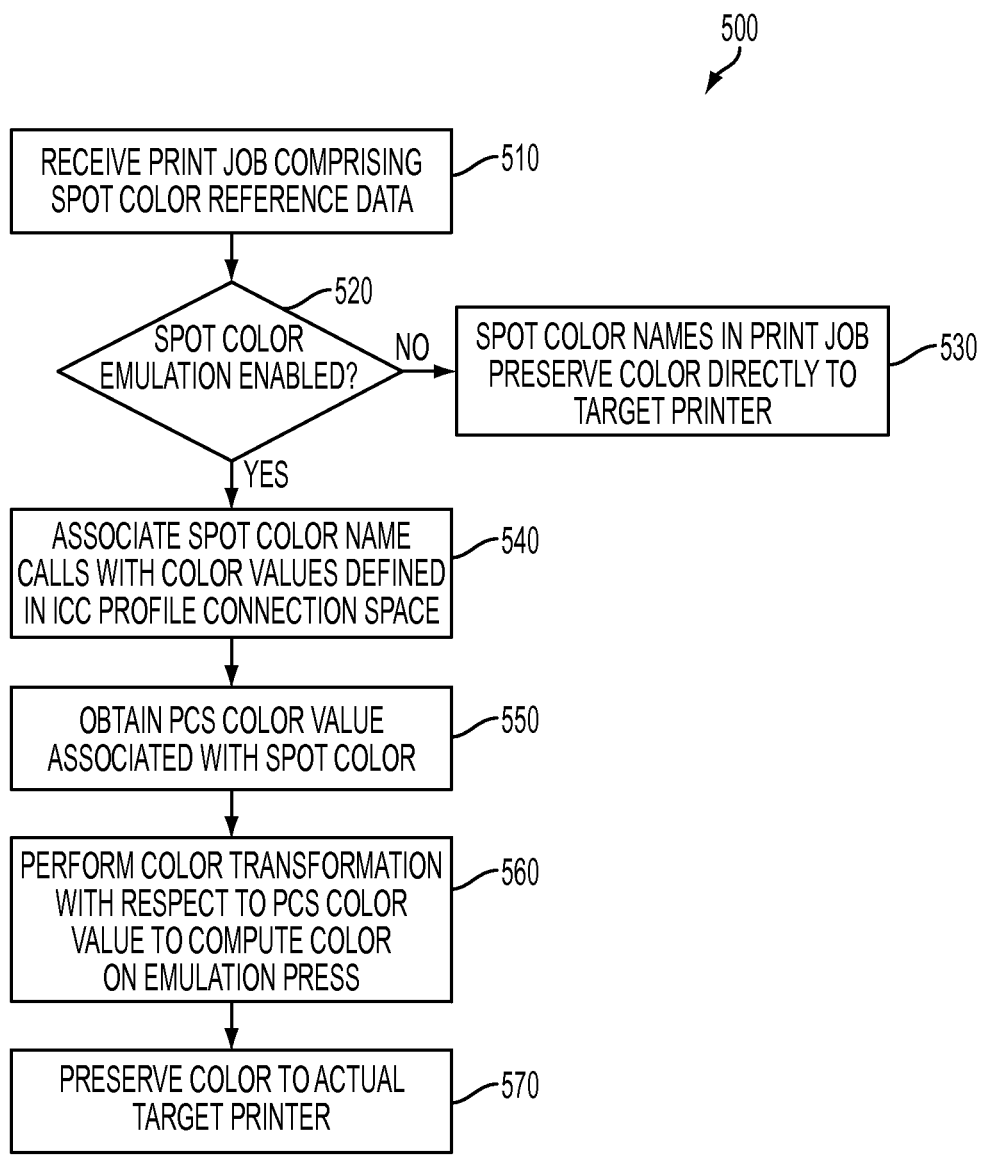
FIG. 5 illustrates a high level flow chart of operations illustrating logical operational steps of a method for implementing spot color press emulation color transformation, in accordance with an embodiment.

FIG. 5 illustrates a high level flow chart of operations illustrating logical operational steps of a method 500 for press emulation of the spot colors, in accordance with an embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIG. 1.

The rendering job 210 comprising the spot color reference data 220 can be received, as depicted at block 510. A test may be then performed as illustrated at block 520 to determine if the spot color emulation button 310 depicted in FIG. 3, is enabled. If the spot color emulation button 310 is not enabled, then the spot color names associated with the rendering job 210 can preserve the color directly to the target rendering device 180, as indicated at block 530. Otherwise, the spot color name calls can be associated with the color values defined in the profile connection space 230, as depicted at block 540.

The database 185 may be associated with the profile connection space 230 and can be configured to include a relation of the spot color name 245 with its associated PCS numerical value and enables association of the name with a resultant color transformed output. The PCS color value associated with the spot color can be obtained, as illustrated at block 550. Thereafter, as depicted at block 560, color transformation 155 with respect to the PCS color value can be performed in order to compute a color on the emulation press 270. The color can be preserved to the actual target rendering device 180, as indicated at block 570. Such an approach enables a color consistent rendering to the target rendering device 180 similar to that of the emulation press 270.

Figure 6:
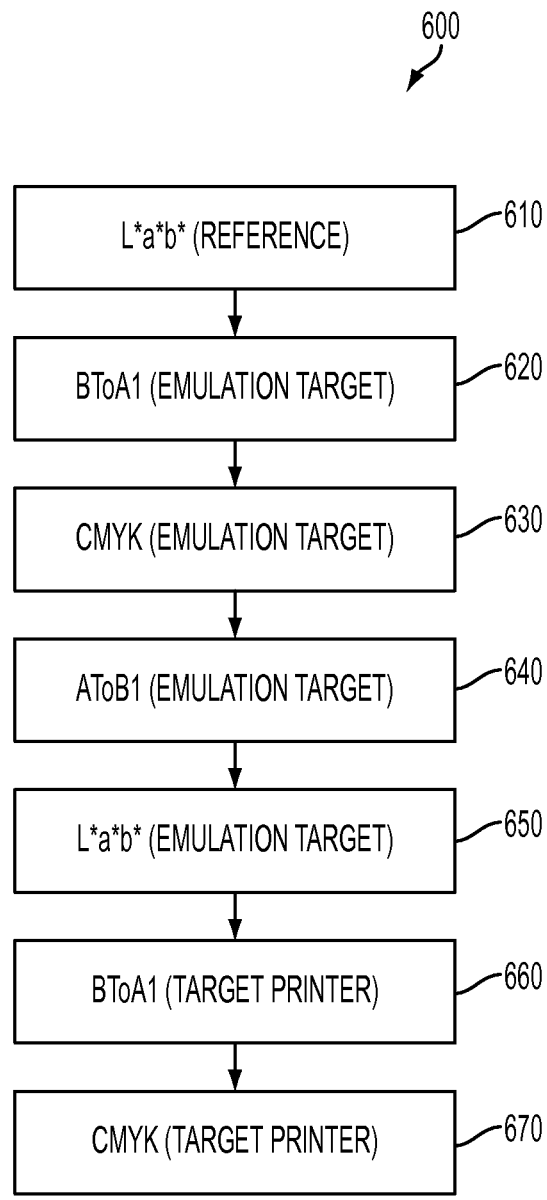
FIG. 6 illustrates a detailed flow chart of operations illustrating logical operational steps of a method for press emulation of spot colors, in accordance with an embodiment.

FIG. 6 illustrates a detailed flow chart of operations illustrating logical operational steps of a method 600 for implementing spot color press emulation transformation 155, in accordance an embodiment. The PCS reference value of the spot color name undergoes color transforms to preserve the final color target rendering device output as if it is rendered on the emulation press 270. The PCS reference value (L*a*b* or XYZ) 610 associated with the spot color can be transformed through the emulation press color ICC profile 250 via a BToA1 tag 620. Such an operation can also be performed via the use of an equivalent relative colorimetric destination LUT 260 of the emulation press profile selected.

Note that the ICC profiles contain numerous smaller data structures called tags. Some tags quantify a rendering devices gamut and determines how it can be utilized while other tags hold maps or lookup tables between color spaces. An ICC profile can include a destination profile AtoB1 tag and a BtoA1 tag. For rendering devices, the AtoB1 tag and the BtoA1 tag hold the forward printer model and inverse printer model, respectively. The digit 1 in the tag name indicates media-relative colorimetric intent. The BtoA1 tag 620 can hold gamut constraints implicitly. The BtoA1 tag 620 defines a color transform from device to PCS utilizing lookup table tag element structures. The AtoB1 tag 640 defines a color transform from PCS to device using the lookup table tag element structures.

Thereafter, CMYK values 630 can be transformed with an AToB1 tag 640 of the emulation press color ICC profile 250. Such an operation can be performed via the use of AToB1 tag 640 within the ICC profile 250, or an equivalent relative colorimetric rendering for CMYK→PCS that is valid for the emulation press selected. Next, from the AToB1 transform 640, the CMYK value produces a valid L*a*b* color 650. The emulation target L*a*b* color 650 represents how the spot color can be rendered on the emulation press 270. Such an operation produces a PCS (L*a*b*) color value that can be valid for the spot color on the selected emulation press 270. The PCS value (L*a*b*) can then be converted through the BToA1 tag 660 of the target rendering device profile utilizing the LUT 260. The PCS (L*a*b*) can be converted to an appropriate CMYK value 670. The CMYK value 670 preserves the L*a*b* color to the target rendering device 180.

A device link can be constructed that captures all transformation into a single L*a*b*→CMYK device link profile during the initial creation of the first instantiation of spot color emulation to the emulation press 270. The profile can be subsequently re-used in situations where subsequent print jobs refer to the same emulation press, thereby enhancing RIP speeds with a pass through LUT.

Note that RIP (Raster Image Processor) refers generally to a component used in a printing system, which produces a raster image also known as a bitmap. The bitmap is then sent to a printing device for output. The input may be a page description in a high-level page description language such as PostScript, Portable Document Format, XPS or another bitmap of higher or lower resolution than the output device. In the latter case, the RIP applies either smoothing or interpolation algorithms to the input bitmap to generate the output bitmap. Raster image processing is the process and the means of turning vector digital information such as a PostScript file into a high-resolution raster image. An example of an RIP is disclosed in U.S. Patent Application Publication No.

20090002726, entitled "Raster Image Processing of Hold Jobs When Digital Front End is Idle," which published on Jan. 1, 2009 and is incorporated herein by reference.

While the present invention has been particularly shown and described with reference to a preferred embodiment, it will be understood by those skilled in the art that various changes in form and detail may be made therein without departing from the spirit and scope of the invention. The system 200 appropriately maps the target colors in an ICC workflow that enables color preservation across devices. The proposed approach can be utilized for in-gamut colors and out-of-gamut colors. For out-of-gamut colors, engine to engine color variation can be reduced by mapping to an intermediate gamut closer to the rendering device gamut.

Based on the foregoing, it can be appreciated that the foregoing description describes emulation via the mapping of an ICC profile to obtain a standard, alternative set of, for example, PCS Lab Colors for matching standard presses. However, also included in the disclosed concept is the use of alternative Lab values, as a pre-mapped table, which represents mapped Spot Colors of a standard nature from a standard table. So, in addition to deriving new Lab targets via industry standard ICC profiles, a pre-selected table containing already matching Lab values can be utilized. Thus, an ICC method and a simple use of an alternative, pre-mapped LUT offers "emulation" matched Lab values in accordance with the disclosed embodiments It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A spot color press emulation color transformation method, said method comprising:
   associating a spot color name call with respect to a rendering job with a color value defined in a profile connection space by searching a database with at least one spot color name associated with a reference value of said profile connection space;
   processing a color transformation with respect to said color value in order to compute a color via an emulation press;
   preserving said color computed to a target rendering device when a spot color rendering option is selected; and
   enabling said target rendering device to re-use said color computed as a spot color via said emulation press on a subsequent rendering job.

2. The method of claim 1 wherein processing a color transformation with respect to said color value further comprises:
   transforming said color value associated with said spot color name through an emulation press color profile utilizing a LUT associated with said emulation press to CMYK value.

3. The method of claim 2 wherein processing a color transformation with respect to said color value further comprises:
   transforming said CMYK value through said emulation press color profile utilizing said LUT to a PCS color value that represents a spot color rendered on said target rendering device.

4. The method of claim 3 further comprising configuring a device link to capture a transformation of said PCS color value to said CMYK value in order to thereafter reuse said device link, if said rendering job references said emulation press, thereby enhancing an RIP speed with a pass through said LUT.

5. The method of claim 3 wherein processing a color transformation with respect to said color value further comprises:
   converting said PCS color value utilizing said LUT to CMYK value that preserves said PCS color value and rendering said CMYK value on said rendering job on said target rendering device.

6. The method of claim 1, wherein said profile connection space comprises at least one of the following set of spot colors: CIE L*a*b* colors and CIE XYZ.

7. The method of claim 1 further comprising:
   configuring a user interface to invoke said spot color rendering option utilizing a radio selection button displayable within said user interface; and
   associating said radio selection button with an existing user interface selection for color management.

8. The method of claim 1 further comprising mapping said color in a workflow to enable color preservation across said target rendering device.

9. The method of claim 1 further comprising configuring a spot color press emulation protocol with respect to an in-gamut color and an out-of-gamut color.

10. The method of claim 9 further comprising mapping an intermediate gamut closer to a rendering device gamut with respect to said out-of-gamut color in order to reduce engine-to-engine color variations thereof.

11. A system for spot color press emulation color transformation, said system comprising:
   a processor;
   a data bus coupled to said processor; and
   a computer-usable medium embodying computer code, said computer-usable medium being coupled to said data bus, said computer program code comprising instructions executable by said processor and configured for:
      associating a spot color name call with respect to a rendering job with a color value defined in a profile connection space by searching a database with at least one spot color name associated with a reference value of said profile connection space;
      performing a color transformation with respect to said color value in order to compute a color on an emulation press;
      preserving said color computed therein to a target rendering device when a spot color rendering option is selected; and
      enabling said target rendering device to re-use said color computed as a spot color via said emulation press therein on a subsequent rendering job.

12. The system of claim 11 wherein said instructions for performing a color transformation with respect to said color value further comprises:
   transforming said color value associated with said spot color name through an emulation press color profile utilizing a LUT associated with said emulation press to CMYK value.

13. The system of claim 12 wherein said instructions for performing a color transformation with respect to said color value further comprises:
   transforming said CMYK value through said emulation press color profile utilizing said LUT to a PCS color value that represents a spot color rendered on said target rendering device.

14. The system of claim 13 wherein instructions for performing a color transformation with respect to said color value further comprise:
  converting said PCS color value utilizing said LUT to CMYK value that preserves said PCS color value and rendering said CMYK value on said target rendering device.

15. The system of claim 13 wherein said instructions are further configured for modifying a device link to capture a transformation of said PCS color value to said CMYK value in order to thereafter reuse said device link, if said rendering job references said emulation press, thereby enhancing an RIP speed with a pass through said LUT.

16. The system of claim 11 wherein said profile connection space comprises at least one of the following set of spot colors: CIE L*a*b* colors and CIE XYZ.

17. The system of claim 11 wherein said instructions are further configured for:
  modifying a user interface to invoke said spot color rendering option utilizing a radio selection button displayable within said user interface; and
  associating said radio selection button with an existing user interface selection for color management by a digital front end component.

18. The system of claim 11 wherein said instructions are further configured for mapping said color in a workflow to enable color preservation across said target rendering device.

19. The system of claim 11 wherein said instructions are further configured for:
  modifying a spot color press emulation protocol with respect to an in-gamut color and an out-of-gamut color; and
  mapping an intermediate gamut closer to a rendering device gamut with respect to said out-of-gamut color in order to reduce engine-to-engine color variations thereof.

20. A system for spot color press emulation color transformation, said system comprising:
  a processor;
  a data bus coupled to said processor; and
  a computer-usable medium embodying computer code, said computer-usable medium being coupled to said data bus, said computer program code comprising instructions executable by said processor and configured for:
    associating a spot color name call with respect to a rendering job with a color value defined in a profile connection space by searching a database with at least one spot color name associated with a reference value of said profile connection space;
    performing a color transformation with respect to said color value in order to compute a color on an emulation press;
    preserving said color computed therein to a target rendering device when a spot color rendering option is selected;
    enabling said target rendering device to re-use said color computed as a spot color via said emulation press therein on a subsequent rendering job; and
    modifying a spot color press emulation protocol with respect to an in-gamut color and an out-of-gamut color.

* * * * *